United States Patent
Dlugoss et al.

(10) Patent No.: US 8,620,538 B2
(45) Date of Patent: Dec. 31, 2013

(54) SYSTEM AND METHOD FOR DETECTING VEHICLE MOVEMENT BASED ON DRIVELINE TORQUE SENSOR

(75) Inventors: Randall B. Dlugoss, Royal Oak, MI (US); John R. Maten, Royal Oak, MI (US); Micheal P Portell, Ann Arbor, MI (US)

(73) Assignee: GM Global Technology Operations LLC

( * ) Notice: Subject to any disclaimer, the term of this patent is extended or adjusted under 35 U.S.C. 154(b) by 759 days.

(21) Appl. No.: 12/345,034

(22) Filed: Dec. 29, 2008

(65) Prior Publication Data
US 2010/0168967 A1 Jul. 1, 2010

(51) Int. Cl.
*G06F 7/00* (2006.01)
*B60W 10/10* (2012.01)

(52) U.S. Cl.
USPC ............................................. 701/51; 477/34

(58) Field of Classification Search
USPC .................. 701/51–54; 477/34–37
See application file for complete search history.

(56) References Cited

U.S. PATENT DOCUMENTS

| 4,717,207 A | 1/1988 | Kubota et al. |
| 2004/0133365 A1* | 7/2004 | Drumm et al. ................. 702/41 |
| 2008/0045380 A1* | 2/2008 | Ebner et al. ..................... 477/94 |
| 2008/0086251 A1* | 4/2008 | Lu et al. .......................... 701/70 |
| 2008/0183353 A1* | 7/2008 | Post et al. ....................... 701/42 |

FOREIGN PATENT DOCUMENTS

| DE | 3618532 | 12/1986 |
| DE | 102004045829 | 4/2006 |
| DE | 102007058416 | 7/2008 |

* cited by examiner

*Primary Examiner* — Yonel Beaulieu

(57) ABSTRACT

A system and method for detecting vehicle movement based on the measurement of the torque value on a vehicle drivetrain is disclosed. The system includes a torque sensor for measuring the torque on a vehicle drivetrain. This measured torque is utilized by a control module, with various other measured vehicle parameters, to determine if the conditions are such that vehicle movement may occur or has already begun. Possible vehicle movement is indicated when either the measured torque value exceeds a threshold value and changes towards zero, or big noise spikes are present in the torque sensor output signal.

22 Claims, 4 Drawing Sheets

SYSTEM AND METHOD FOR DETECTING VEHICLE MOVEMENT BASED ON DRIVELINE TORQUE SENSOR

FIELD

The present disclosure relates to vehicle sensing systems and, more specifically, a system and method for determining possible vehicle movement by measuring the torque on a vehicle drivetrain.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of an engine system 100 is presented. An engine 102 produces drive torque for a vehicle. In the illustrated example, an internal combustion engine is described, however, it should be noted that any torque producing device may be used, such as, but not limited to, an electric motor, diesel engine or turbine. Air is drawn into the engine 102 through an intake manifold 104. A throttle valve 106 varies the volume of air drawn into the intake manifold 104. Opening of the throttle valve 106 is controlled by an electronic throttle control (ETC) motor 107. The air mixes with fuel from one or more fuel injectors 108 to form an air and fuel (A/F) mixture.

The A/F mixture is combusted within one or more cylinders of the engine 102, such as cylinder 110. In various engine systems, such as the engine system 100, combustion is initiated by a spark provided by a spark plug 112. Exhaust resulting from combustion is expelled from the cylinders to an exhaust system 114. Combustion of the A/F mixture produces torque. The engine 102 may transfer torque to a transmission 116, which may transfer torque to one or more wheels of the vehicle.

A control module 130 controls, among other things, torque output by the engine 102 based on temperatures provided by one or more temperature sensors. The temperature sensors each measure a temperature and may be located at various locations throughout the engine system 100. For example only, the engine system 100 may include an engine coolant temperature (ECT) sensor 118, an intake air temperature (IAT) sensor 120, an oil temperature (OT) sensor 122, a transmission oil temperature sensor 124, and/or an ambient air temperature sensor (not shown).

In addition, the control module 130 receives a signal from a speed sensor (not shown) in order to determine if the vehicle is moving. Speed sensors have a number of limitations, including the inability to detect low speed movement of a vehicle, which is sometimes related to the sampling frequency of the sensor. Furthermore, speed sensors may be sensitive to noise at engine start-up or vibration during idle. This sensitivity results in the speed sensor indicating high speed movement even when the vehicle is stationary.

SUMMARY

In one aspect, the present disclosure is directed to a system for detecting movement of a vehicle. This system comprises a torque sensor for detecting the torque on a vehicle drivetrain, as well as a controller that utilizes the torque value to determine possible vehicle movement. In some embodiments, the torque sensor is coupled to the output shaft of the vehicle transmission. The system monitors the measured torque value on a vehicle drivetrain. When the torque value exceeds a torque value threshold and then changes its magnitude and directionality, as would be expected if the vehicle started moving, the system outputs an indication of possible vehicle movement.

In another aspect, the present disclosure is directed to a method of determining vehicle movement. The method detects and measures a torque value on a vehicle drivetrain in order to determine possible vehicle movement. Once the measured torque value exceeds a threshold, the method monitors the torque value in order to determine possible vehicle movement. In certain vehicle conditions, the torque value will change towards zero upon beginning of vehicle movement. In other vehicle conditions, the signal of the measured torque value will exhibit bigger noise spikes. In either of these situations, the method of the present disclosure will determine that the vehicle has either begun moving, or the conditions are such that vehicle movement may occur.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The system and method of the present disclosure operates on the principle that movement of a vehicle can be determined by changes of the output torque on a vehicle drivetrain. In a static state, a vehicle can be expected to exert a torque on the vehicle drivetrain. The value of this static output torque is dependent upon the condition of the vehicle. For example, when the vehicle orientation is uphill and it is in park, it can be expected that a torque value on the torque sensor will be related to the angle of incline, mass of the vehicle, and an amount of loss due to frictional components of the mass acceleration system described herein.

A torque sensor may be utilized to detect movement of a vehicle. The torque sensor may measure torque direction and magnitude on a drivetrain, and utilize this measured torque value to determine vehicle movement. In some embodiments, the torque sensor is connected to the output shaft of the transmission. For every possible vehicle condition, there is an expected static output torque ("ESOT") that may be measured by the torque sensor. This expected static output torque value may be calibrated based on a specific vehicle to which the torque sensor is applied. The various vehicle conditions include, but are not limited to, the transmission being in park, drive, reverse, or neutral, the orientation of the vehicle, for example, uphill, downhill, or level, engine on or off, brakes on or off, powertrain accessory loads on or off vehicle loaded or not loaded and the amount of load.

Figure 1:
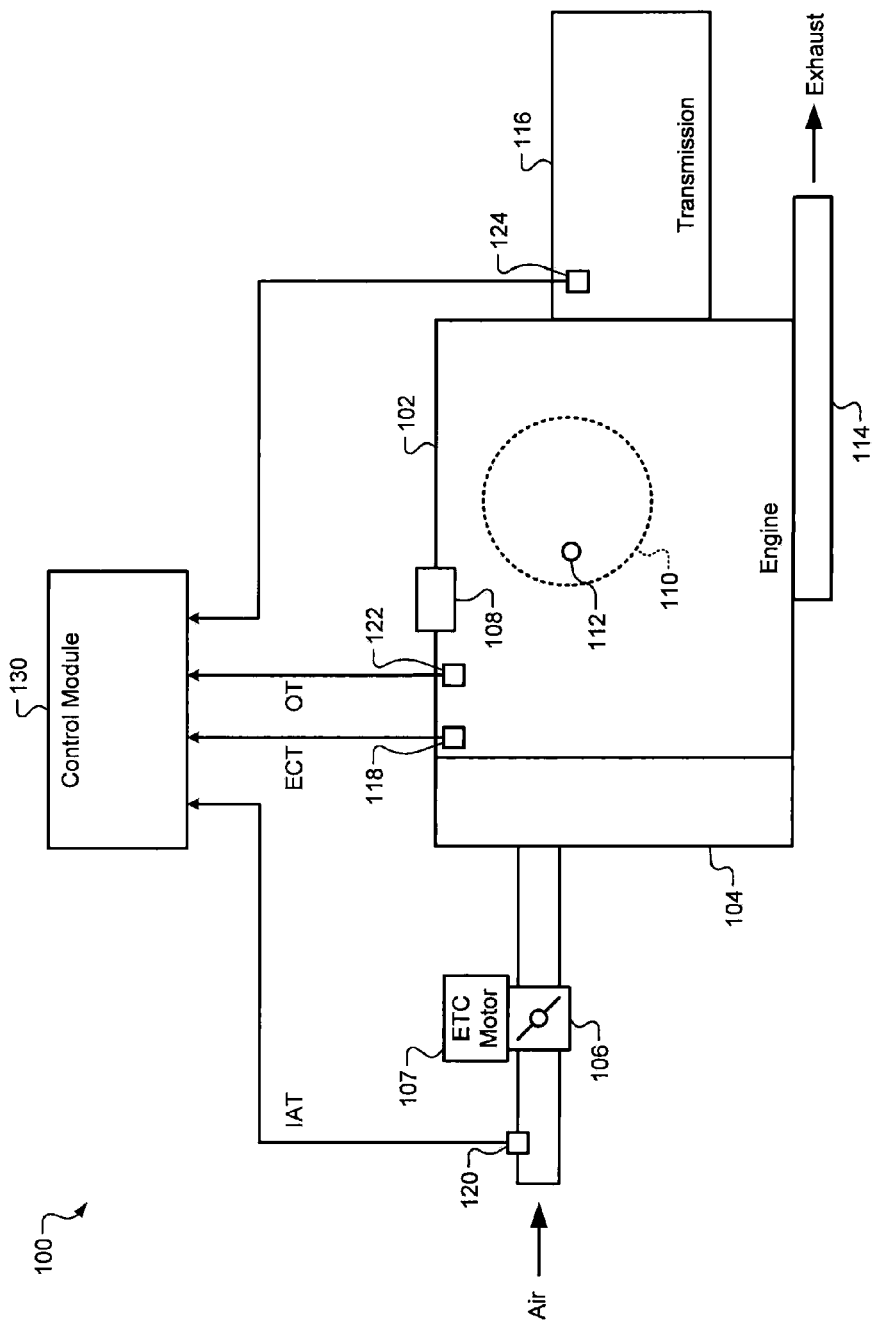
FIG. 1 is a functional block diagram of an engine system according to the prior art.
Figure 2:
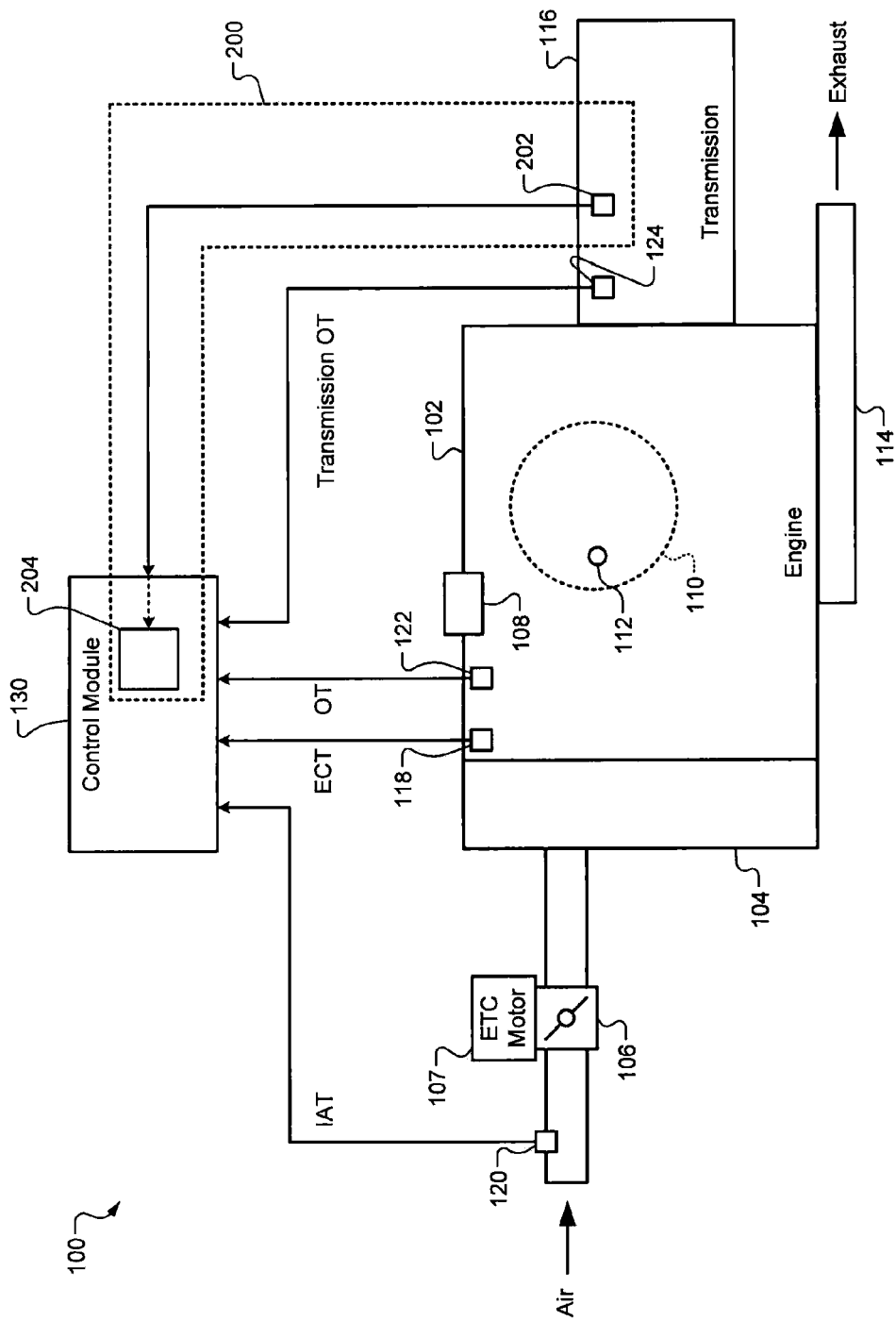
FIG. 2 is a functional block diagram of an engine system with an associated vehicle movement detection system according to some embodiments of the present disclosure.

Referring now to FIG. 2, a functional block diagram of an engine system 100 with an exemplary vehicle movement detection system 200 according to some embodiments of the present disclosure is presented. The vehicle movement detection system 200 comprises a torque sensor 202 and control module 204. Control module 204 may comprise a computer program or application running on control module 130, as illustrated in FIG. 2. Alternatively, control module 204 may comprise a separate control module from control module 130.

The inputs to control module 204 include an output from torque sensor 202. Further inputs to control module 204 may include, for example, brake position, shift lever position, transmission input speed sensor (TISS) output, transmission output speed sensor (TOSS) output, vehicle orientation and altitude (for example, from a GPS system or the like). Each of these inputs may be used by a control module 204 to determine vehicle movement, as described more fully below.

Figure 3:
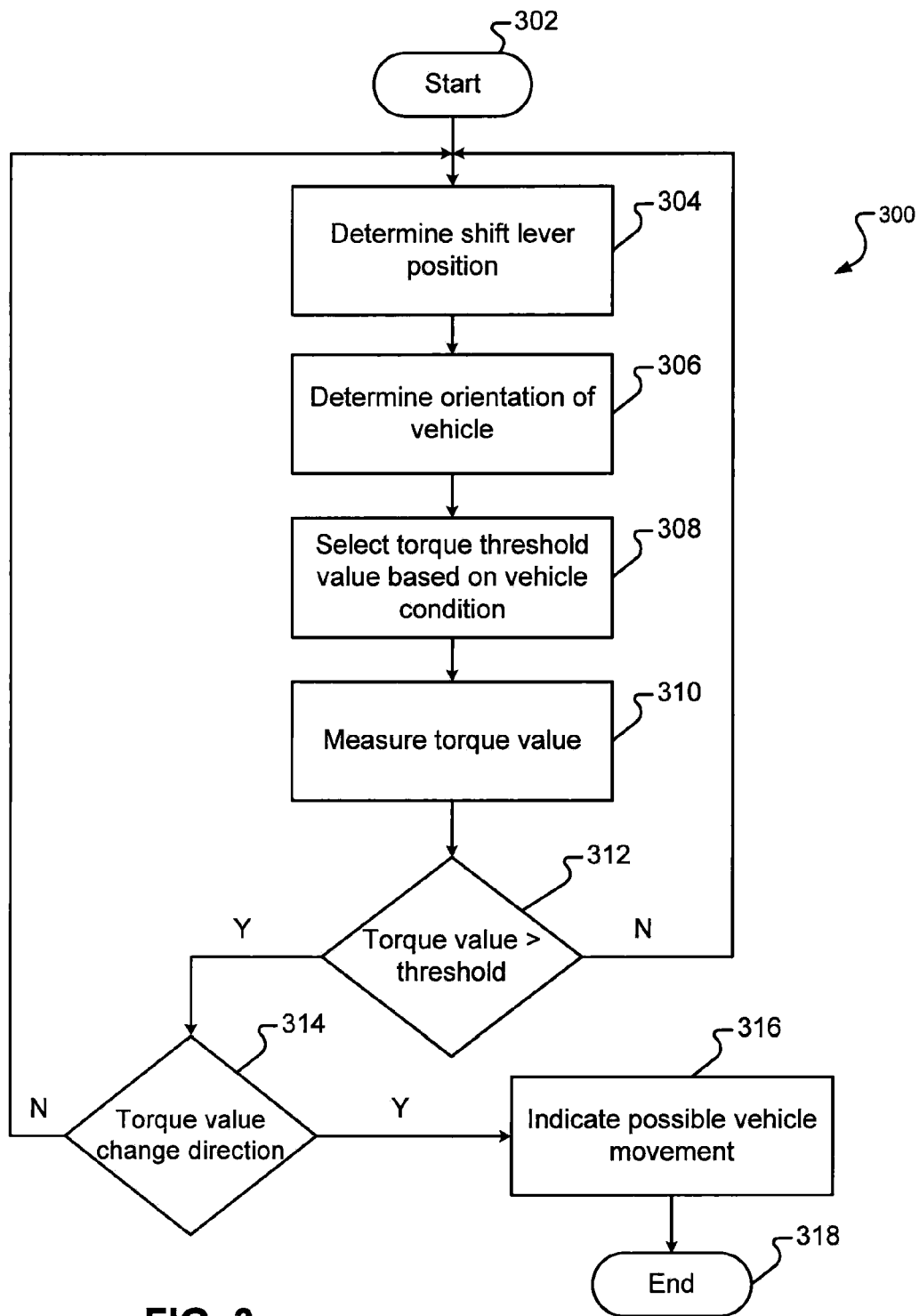
FIG. 3 is a flow chart illustrating the steps of an exemplary embodiment of a vehicle movement detection method.

Referring now to FIG. 3, a flow chart illustrating a method of detecting vehicle movement 300 according to some embodiments of the present disclosure is presented. The method starts at step 302. The position of the shift lever of the vehicle is determined at step 304, e.g., park, drive, reverse or neutral. At step 306, the orientation of the vehicle is determined. The orientation of the vehicle may comprise, for example, a state of facing uphill, downhill, or being on a level surface, as well as the angle of incline.

The method continues at step 308 where a torque threshold value is determined based on the condition of the vehicle. In this exemplary embodiment, the vehicle condition is based on the position of the shift lever and the orientation of the vehicle. The torque threshold value varies based on the vehicle condition, as one would expect. The torque threshold value for each vehicle condition may be calibrated at the time of vehicle system development. In some embodiments, the set of torque threshold values is stored in a look-up table that may be accessed by control module 204. In this manner, control module 204 utilizes the vehicle condition, as described above, comprising shift lever position and orientation of vehicle, as the reference for the torque threshold value of interest.

The torque value is then measured at step 310. At step 312, the torque value is compared to the torque threshold value from step 308. If the torque value is less than the torque threshold value, the method 300 returns to beginning at step 304. If the torque value is greater than the torque threshold value, however, the method 300 passes onto step 314, which determines if measured torque value has changed direction. If the measured torque value has not changed direction, the method 300 returns to step 304. If the measured torque value has changed direction, the method 300 passes onto step 316, which indicates there may be vehicle movement. Accordingly, control module 204 and/or control module 130 may be alerted to possible vehicle movement and appropriate actions may be initiated. The method ends at step 318.

Table 1 lists the output of a torque sensor on the transmission output shaft for various vehicle conditions. The conditions illustrated in Table 1 are merely examples of vehicle conditions and do not include all of the possible vehicle conditions. In Table 1, the vehicle is not moving and a brake is on. For each of the vehicle conditions, an expected static output torque ("ESOT") value may be determined. This ESOT value is dependent on the vehicle in question. For example, when in park and in an uphill orientation, $ESOT_{P1}$ can be measured on the vehicle's drivetrain. $ESOT_{P1}$ is the torque value that acts opposite the force on the vehicle urging it to roll backwards, or in this case, downhill. In park on a level surface, it is expected that there is no torque value measured on the vehicle drivetrain. This is also true when the vehicle's shift lever is in neutral, no matter in which orientation the vehicle is.

TABLE 1

| Vehicle Condition | Uphill | DownHill | Level |
|---|---|---|---|
| Park | $ESOT_{P1}$ | $ESOT_{P2}$ | 0 |
| Drive | $ESOT_{D1}$ | $ESOT_{D2}$ | $ESOT_{D3}$ |
| Reverse | $ESOT_{R1}$ | $ESOT_{R2}$ | $ESOT_{R3}$ |
| Neutral | 0 | 0 | 0 |

The measured torque value on the vehicle drivetrain at the point which the brake is released but the vehicle has not yet moved is shown in Table 2. The measured torque deviates from the ESOT in each case where there is a measured ESOT value, the directionality of the measured torque value reverses and the torque magnitude moves towards zero. In the situations where the ESOT value equals zero (that is, when the vehicle is in neutral or in park on a level surface), there is no change in torque value as the vehicle has not yet moved.

TABLE 2

| Vehicle Condition | Uphill | DownHill | Level |
|---|---|---|---|
| Park | $>ESOT_{P1}$ | $<ESOT_{P2}$ | 0 |
| Drive | $>ESOT_{D1}$ | $<ESOT_{D2}$ | $>ESOT_{D3}$ |
| Reverse | $<ESOT_{R1}$ | $>ESOT_{R2}$ | $<ESOT_{R3}$ |
| Neutral | 0 | 0 | 0 |

Table 3 is a chart indicating a measured torque value on a vehicle drivetrain when the vehicle begins moving from the stationary position measured in Table 2. As stated above, in every case where there is an ESOT measured, the measured torque changes towards zero ("CTZ"). In other words, the torque exerted on a vehicle drivetrain has overcome the coefficient of friction and, thus, has forced the vehicle to begin moving. The measured torque value decreases in absolute value, but the directionality of the measured torque value also reverses. In situations where there was no measured torque value indicated in Table 2 above, the measured torque value indicates big noise spikes ("BNS") which may be due to, e.g., drivetrain pulsation, rough road and wheel friction changes. In both cases, a measurement of this torque sensor that has big noise spikes when in neutral or in park on a level surface indicates possible vehicle movement. Furthermore, in all other vehicle conditions illustrated in Tables 1-3, once the measured torque value exceeds a torque value threshold (that is, the absolute value of the measured torque, also referred to as the torque magnitude) and the directionality of the torque reverses, possible vehicle movement is indicated.

TABLE 3

| Vehicle Condition | Uphill | DownHill | Level |
|---|---|---|---|
| Park | CTZ | CTZ | BNS |
| Drive | CTZ | CTZ | CTZ |
| Reverse | CTZ | CTZ | CTZ |
| Neutral | BNS | BNS | BNS |

The calibration of the expected torque value threshold is determined on a vehicle-by-vehicle basis. Vehicle prototype testing may be utilized to determine the threshold torque value for a given vehicle type, which may then be extrapolated or generalized to the production units of that vehicle. In some embodiments, the expected torque value threshold is set conservatively, such that it is less likely that an indication of possible vehicle movement will be erroneous.

The expected torque value threshold, as shown in FIG. 3 at step 312, is the gateway to the remaining steps of the process. If the measured torque value never exceeds the expected torque value threshold, the system and method of the present disclosure will not indicate possible vehicle movement, i.e., the system and method does not detect a big noise spike if the car is in neutral or in park on a level surface, or the change towards zero in other vehicle conditions will not indicate vehicle movement, if the threshold has not been exceeded. Furthermore, it is contemplated that the system and method of the present disclosure will not operate unless and until the vehicle is or becomes stationary. Thus, if the transmission output speed sensor indicates a vehicle speed, control module 204 may not attempt to determine possible vehicle movement. In various embodiments, control module 204 will continuously perform the method of this disclosure and output an indication of possible vehicle movement when appropriate. In these embodiments, control module 130 may disregard the indication of possible vehicle movement if already aware of the motion of the vehicle, e.g., when TOSS is greater than zero.

Control module 204, independently of or in conjunction with control module 130, may utilize the determination of possible vehicle movement to take corrective actions. These actions may include, for example, the automatic application of the vehicle brake, the turning off of a remote start feature, the inhibition of a neutral idle, application of a torque converter clutch or modifying the coupling factor (K-Factor) of the torque converter to inhibit transmission movement, and/or diagnostics. Additional forms of intervention may be performed by the vehicle, as those listed above are just examples. The system and method of the present disclosure allows for an earlier detection of possible vehicle movement at low speed when compared to the direct measurement by a speed sensor. Thus, any vehicle system or control method that utilizes the output speed sensor measurement to perform its function may benefit from the system and method of the present disclosure.

Figure 4:
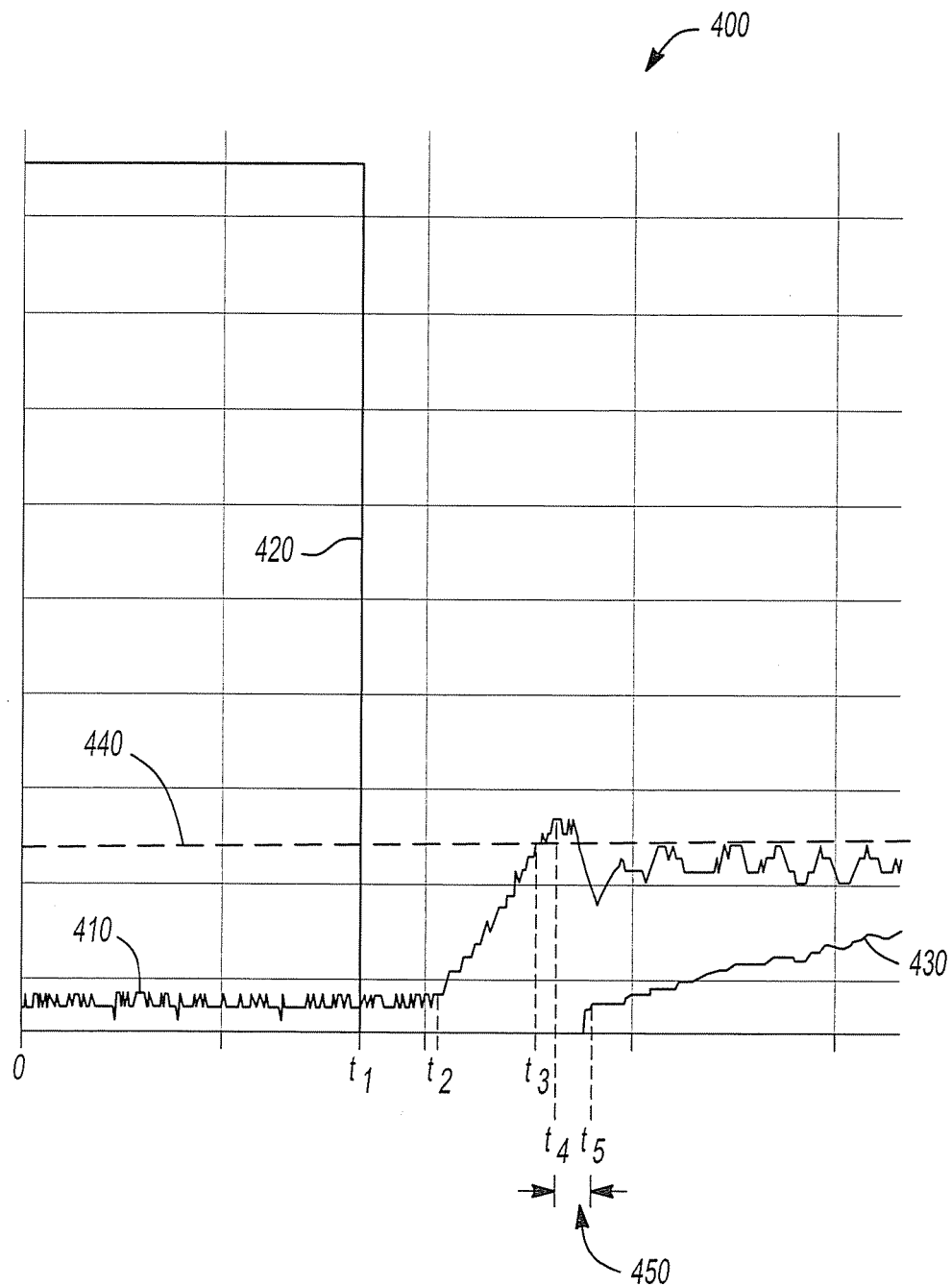
FIG. 4 is a graphical representation of an exemplary torque signal, transmission position signal, and speed sensor signal according to some embodiments of the present invention.

Referring now to FIG. 4, a graphical representation 400 of an exemplary torque signal, transmission position signal, and speed sensor signal is illustrated. Torque signal 410 indicates a zero load, with small variations mostly due to noise, on the torque sensor between times 0 and $t_2$. Transmission position signal 420 indicates a park condition of the vehicle at time 0, which abruptly changes to a drive condition at time $t_1$. At time $t_2$, the torque signal 410 begins to indicate an increase in the torque on the torque sensor. The torque signal 410 passes a torque threshold 440 at time $t_3$. The torque signal 410 continues to rise until time $t_4$, at which point the torque signal 410 changes direction. As described more fully above, the change in direction of the torque signal 410 after passing the torque threshold 440 may indicate possible vehicle movement. Only at time $t_5$ does the speed sensor signal 430 indicate a non-zero speed value, and there is a time difference 450 between the indication of possible vehicle movement by the torque sensor signal 410 and the speed sensor signal. Thus, the torque sensor signal 410 may be utilized, as described above, to provide a quicker indication of possible vehicle than is possible with a speed sensor signal 430 alone.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for detecting movement of a vehicle, comprising:
    a torque sensor that detects a torque value on a vehicle drivetrain;
    a transmission output speed sensor that senses a transmission speed; and
    a controller that i) determines a torque threshold based on a position of a shift lever and ii) determines, in response to the torque value being greater the torque threshold, whether the vehicle has moved from a stationary position based on the torque value and the sensed transmission speed.

2. The system of claim 1, wherein the torque sensor is operably coupled to an output shaft of a transmisson of the vehicle.

3. The system of claim 1, wherein the controller determines whether the vehicle has moved from a stationary position based on a change of the torque value.

4. The system of claim 1, wherein the controller determines whether the vehicle has moved from a stationary position based on a change of the torque value.

5. The system of claim 1, wherein the controller determines whether the vehicle has moved from a stationary position based on a fluctuation of the torque value greater than an expected torque value threshold.

6. The system of claim 5, wherein the expected torque value threshold is based on a vehicle condition.

7. The system of claim 6, wherein the vehicle condition comprises park, drive, reverse or neutral.

8. The system of claim 1, wherein the controller determines whether the vehicle has moved from a stationary position based on an abrupt change of the torque value in a direction opposite that of a loaded torque value.

9. The system of claim 6, wherein the controller determines whether the vehicle has moved from a stationary position based on an abrupt change of the torque value in a direction opposite that of a loaded torque value when the expected torque value threshold exceeds a threshold.

10. The system of claim 1, wherein the controller determines whether the vehicle has moved from a stationary position based on the torque value by detecting spikes in an output signal of the torque sensor of a magnitude greater than an expected noise threshold.

11. A method of determining movement of a vehicle, the method comprising:
    detecting a torque value on a vehicle drivetrain;
    sensing a transmission speed;
    determining a torque threshold based on a position of a shift level; and
    determining, in response to the torque value being greater than the torque threshold, whether the vehicle has moved from a stationary position based on the torque value and the sensed transmission speed.

12. The method of claim 11, wherein the torque value comprises a torque magnitude and a torque direction and the step of determining whether the vehicle has moved from a stationary position based on the torque value comprises determining a vehicle state, determining an expected torque value threshold based on the vehicle state, and comparing the torque value to the expected torque value threshold, wherein if the torque value is greater than the expected torque value threshold and the torque magnitude decreases, whether the vehicle has moved from a stationary position is determined.

13. The method of claim 11, wherein the torque value comprises a measurement of torque on an output shaft of a transmission of the vehicle.

14. The method of claim 11, wherein the step of determining whether the vehicle has moved from a stationary position based on the torque value comprises determining whether the vehicle has moved from a stationary position based on a change of the torque value.

15. The method of claim 11, wherein the step of determining whether the vehicle has moved from a stationary position based on the torque value comprises determining whether the vehicle has moved from a stationary position based on an abrupt change of the torque value.

16. The method of claim 11, wherein the step of determining whether the vehicle has moved from a stationary position based on the torque value comprises determining whether the vehicle has moved from a stationary position based on a fluctuation of the torque value greater than an expected torque value threshold.

17. The method of claim 16, wherein the expected torque value threshold is based on a vehicle condition.

18. The method of claim 17, wherein the vehicle condition comprises park, drive, reverse or neutral.

19. The method of claim 11, wherein the step of determining whether the vehicle has moved from a stationary position based on the torque value comprises determining whether the vehicle has moved from a stationary position based on an abrupt change of the torque value in a direction opposite that of a loaded torque value.

20. The method of claim 11, wherein the step of determining whether the vehicle has moved from a stationary position based on the torque value comprises determining whether the vehicle has moved from a stationary position based on an abrupt change of the torque value in a direction opposite that of a loaded torque value when an expected torque value threshold exceeds a threshold.

21. The method of claim 11, wherein the step of determining whether the vehicle has moved from a stationary position based on the torque value comprises detecting spikes in the torque value of a magnitude greater than an expected noise threshold.

22. A system for detecting movement of a vehicle, comprising:
- a torque sensor that detects a torque value on an output of a vehicle drivetrain, wherein the torque value comprises a torque magnitude and a torque direction;
- a transmission output sensor that senses a transmission speed; and
- a controller that determines whether the vehicle has moved from a stationary position based on the torque value and the sensed transmission speed by
- determining a vehicle state,
- determining an expected torque value threshold based on the vehicle state,
- comparing the torque value to the expected torque value threshold, and
- determining that the vehicle has moved from a stationary position if the torque value is greater than the expected torque value threshold and the torque magnitude decreases.

* * * * *